United States Patent
Bugge et al.

(10) Patent No.: US 6,969,025 B1
(45) Date of Patent: Nov. 29, 2005

(54) SERVO ACTUATION SYSTEMS

(75) Inventors: John F. Bugge, Stevenage (GB); Kenneth C. Goulding, Stevenage (GB); Anthony Machell, Stevenage (GB)

(73) Assignee: MBDA UK Limited, Hertfordshire (GB)

(*) Notice: Subject to any disclaimer, the term of this patent is extended or adjusted under 35 U.S.C. 154(b) by 1826 days.

(21) Appl. No.: 07/421,629

(22) Filed: Oct. 6, 1989

(30) Foreign Application Priority Data

Oct. 24, 1988 (GB) ............................................. 8824888

(51) Int. Cl.⁷ ................................................ F41G 7/00
(52) U.S. Cl. ..................... 244/3.16; 244/3.19
(58) Field of Search ............................. 244/3.16, 3.19; 343/757, 758, 761, 763

(56) References Cited

U.S. PATENT DOCUMENTS

| | | | |
|---|---|---|---|
| 2,911,167 A | * 11/1959 | Null et al. ................. | 244/3.16 |
| 2,963,242 A | 12/1960 | Mueller | |
| 3,078,455 A | * 2/1963 | Brainin ...................... | 244/3.19 |
| 3,756,538 A | * 9/1973 | McLean .................... | 244/3.16 |
| 4,123,134 A | * 10/1978 | Meyers ...................... | 244/3.16 |
| 4,267,988 A | 5/1981 | Rodgers | |
| 4,277,039 A | 7/1981 | Blanning et al. | |
| 4,427,878 A | 1/1984 | Buchtel et al. | |
| 4,521,782 A | * 6/1985 | Pinson ...................... | 244/3.16 |
| 4,615,496 A | * 10/1986 | Pinson ...................... | 244/3.16 |
| 4,738,412 A | * 4/1988 | Ozunas ...................... | 244/3.16 |
| 4,802,640 A | * 2/1989 | Reid .......................... | 244/3.19 |

FOREIGN PATENT DOCUMENTS

| | | |
|---|---|---|
| EP | 0 107 232 | 5/1988 |
| GB | 1429882 | 3/1976 |
| GB | 1490726 | 11/1977 |
| GB | 1550812 | 8/1979 |
| NL | 7 204 205 | 10/1973 |
| NL | 7 315 419 | 5/1975 |

* cited by examiner

Primary Examiner—Michael J. Carone
(74) Attorney, Agent, or Firm—Nixon & Vanderhye P.C.

(57) ABSTRACT

A dual servo system for a seeker actuator comprises a seeker head gimballed on a platform and driven in the pitch and yaw senses by respective fast, i.e. high bandwidth low ambit, servo sub-systems, the platform being pivotally mounted with respect to a base and driven in the pitch and yaw senses by respective slow, i.e. low bandwidth high ambit, servo systems. The pivotal mounting between the platform and the base is configured to provide a spherical bearing of relatively large area (typically about 85° solid angle) to provide good resistance to high acceleration loads.

14 Claims, 5 Drawing Sheets

SERVO ACTUATION SYSTEMS

BACKGROUND OF THE INVENTION

1. Field of the Invention

This invention relates to servo actuation systems and in particular, but not exclusively, to seeker actuation systems.

2. Discussion if Prior Art

Servo actuation systems are used on a projectile to orient the seeker head with a desired line of sight. For example, such systems can be used on a projectile such as a guided shell, mortar or a guided missile. The systems typically comprise a seeker head, for example an optical or millimetric radar head, mounted on gimbals for movement in the pitch and yaw senses. In the types of projectile referred to it will be appreciated that the seeker actuation system will be subjected to very high acceleration loads when the projectile is launched. The system must therefore be capable of withstanding very high shock loads whilst being able to provide precise and rapid orientation of the seeker head. Furthermore, it is desirable for the system to allow a large angle of look and to be sufficiently agile to cover a wide search pattern and quickly lock onto a target.

SUMMARY OF THE INVENTION

An actuation system capable of meeting these criteria would be expected to be very expensive and delicate. The Applicants have, however, designed an actuation system which meets at least some of these criteria and which is expected to be relatively inexpensive to manufacture.

According to one aspect of this invention, there is provided a servo system comprising a platform mounted for movement and two servo drive means each operable to displace said platform, one of said servo drive means being operable to effect relatively low bandwidth large displacements of said platform and the other being operable to effect relatively high bandwidth small displacements thereof.

According to another aspect of the invention there is provided a dual servo system comprising platform means mounted for movement in a given sense with respect to a support means, said support means being mounted for movement in substantially the same sense with respect to base means, first drive means for effecting relative movement of said platform means and said support means, second drive means for effecting relative movement of said support means and said base means, said first drive means being capable of effecting high bandwidth movement in a relatively small locus of movement, said second means being capable of effecting low bandwidth movement in a relatively large locus of movement, and control means responsive to an input signal for controlling said first and second drive means to orient said platform means in accordance with said input signal.

According to another aspect of this invention, there is provided a seeker actuation system for a projectile including:

base means for attachment to a projectile, mounting means supported for movement in at least one of the pitch, roll and yaw senses, sensor means mounted for movement with respect to the mounting means at least in said at least one sense, first drive means for effecting movement of said mounting means relative to said base means in said at least one sense, second drive means for effecting movement of said sensor relative to said mounting means in said at least one sense, means responsive to an input demand signal to control each of said first and second drive means to move said sensor to a required position, one of said drive means being capable of effecting movement in a relatively large locus of movement and the other of said drive means being capable of effecting movement in a relatively small locus of movement.

BRIEF DESCRIPTION OF THE DRAWINGS

Further aspects of the invention will be apparent from the following description of non-limiting examples of this invention, reference being made to the accompanying drawings in which:—

DETAILED DISCUSSION OF PREFERRED EMBODIMENTS

The seeker head system illustrated in the Figures allows movement of a sensor about the pitch and yaw axes. For each sense there is provided a dual servo system comprising a high bandwidth low ambit system operating within a low bandwidth high ambit system. The control system outputs appropriate controls to the high bandwidth and low bandwidth systems in response to an input.

Figure 1:
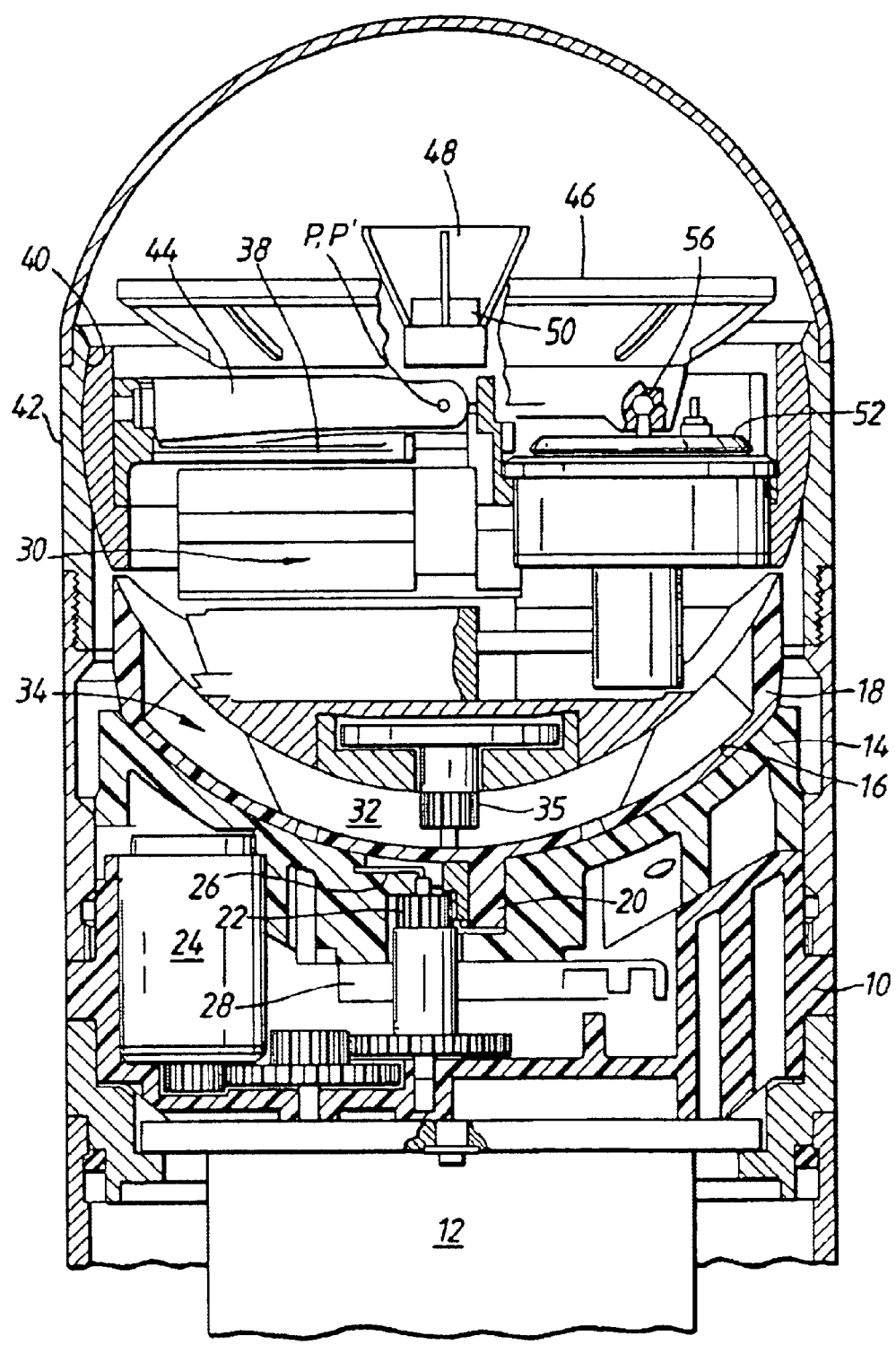
FIG. 1 is a cross-sectional view of an example of seeker head of this invention taken on the pitch plane.
Figure 2:
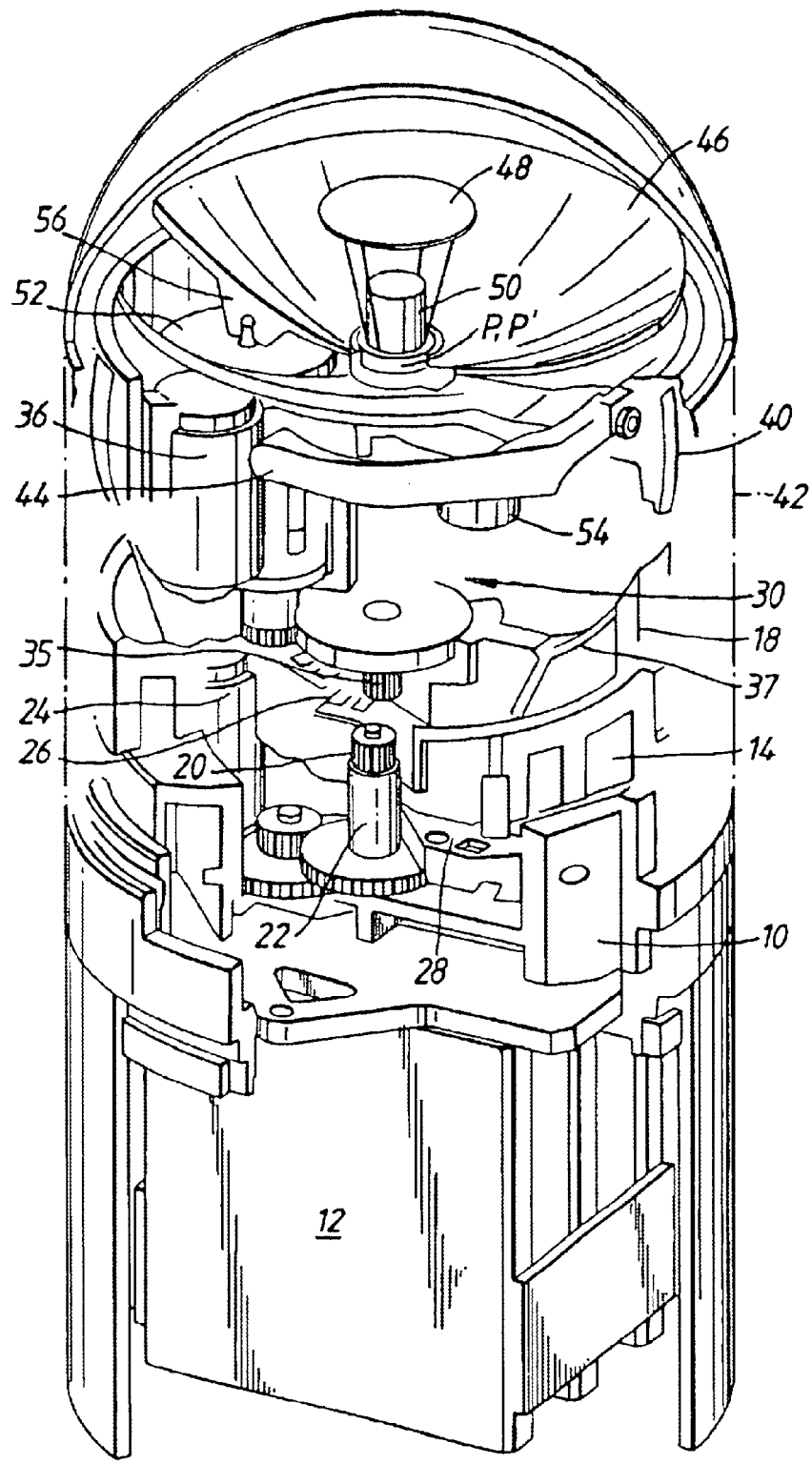
FIG. 2 is a partially cut-away perspective view of the seeker head of FIG. 1.
Figure 3:
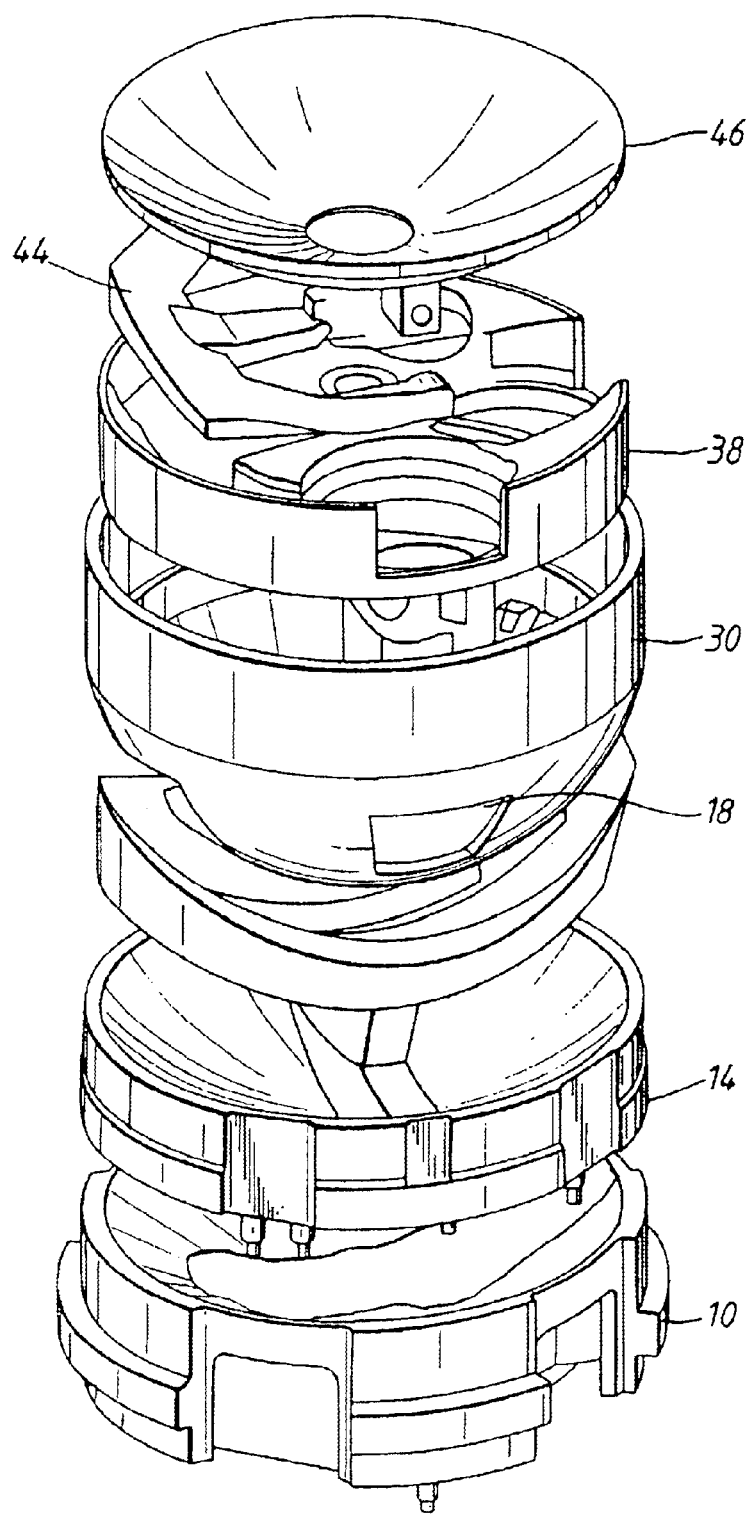
FIG. 3 is an exploded view of the seeker head of FIGS. 1 and 2 showing those parts made from plastics material.

Referring to the seeker head system shown in FIGS. 1 to 3, a base member 10 is attached to the front end 12 of the projectile and carries on its front end a base plate 14 having a concave spherical forward surface 16 which rotatably supports a translation plate 18 for movement about a pivotal centre P of the mechanism. The translation plate 18 has an arcuate rearwardly extending toothed rack 20 which is snugly received in a corresponding slot in the base plate 14 so that the translation plate 18 is constrained to move in a first axis sense. The teeth of the rack 20 engage a pinion 22 connected via a gear train to the slow (outer) first axis motor 24. The position of the translation plate 18 relative to the base plate 14 in the first axis sense is determined by means of a transducer 26 which supplies position signals to a servo control (not shown). The translation plate 18 has a concave spherical forward surface which rotatably supports the chassis 30 of the seeker head for rotation about the pivotal centre P. Movement of the chassis 30 relative to the translation plate 18 is constrained to a second axis sense. The translation plate 18 has an arcuate toothed rack 32 in a slot 34. The teeth of the rack 32 are engaged by a pinion 35 on the chassis 30 connected via a gear train to the outer (slow) second axis motor 36 also mounted on the chassis 30. The position of the chassis 30 relative to the translation plate 18 is determined by means of a pitch transducer 37 which supplies position signals to a servo control (not shown).

The chassis 30 of the seeker head includes an upper mounting plate 38 and is connected via a spherical bearing 40 to the forward casing 42 of the seeker head system, to allow movement of the chassis 30 about the pivotal axis P.

The mounting plate 38 supports a yoke 44 of a gimbal arrangement for pivotal movement about the first axis passing through a pivotal centre P'. The arms of the yoke 44 pivotally support the chassis dish of a cassegrain antenna for movement about the second axis passing through the pivotal centre P'. The remaining components of the cassegrain antenna (the sub-reflector 48 and detector 50) are secured to the chassis 30, and the antenna may pivot as a single unit about the pivotal centre P' in the pitch and yaw senses. The centres P and P' may or may not be coincident.

The mounting plate 38 also supports at locations spaced by 90° two fast (inner) motors 52. Each is a linear motor directly driving the cassegrain antenna gimballed on the yoke 44 to provide an independent pitch and yaw motion. The output shaft of each motor 52 and 54 is connected to the rear surface of the dish 46 by a snap-action ball and socket connection 56.

Motion of the antenna in the pitch and yaw senses is thus effected by the respective dual servo drive arrangements, each comprising a high bandwidth low ambit servo system driven by the fast (inner) motor (54;52) operating within a low bandwidth high ambient servo system driven by the slow (outer) motor (24;26). The control of the servo systems will be discussed below.

The fast (inner) motors (54;52) are each orthogonal linear force motors containing rare earth magnets. The slow (outer) motors (24;26) are each d.c. motors again containing rare earth magnets.

It will be noted that the assembly is guided by a large spherical bearing 40 and the respective bearing surfaces between the base plate 14, the translation plate 18 and the chassis 30. The large overall support area defined by all the bearing surfaces provides high shock resistance to the shocks generated during launch.

FIG. 3 illustrates the major parts of the system which are made from plastics material. It will be seen that the base member 10, the base plate 14, the translation plate 18, the lower part of the chassis 30, the mounting plate 38, and the yoke 44 are made from precision moulded suitable plastics material(s), e.g. an engineering plastics material such as carbon-fibre filled nylon.

Friction in the low bandwidth servo as relative movement occurs between the chassis 30 and the translation plate 18 and the translation plate 18 and the base plate 14 is minimised because the components are precision moulded from plastics.

The dish 46 is made of light alloy and is fitted with sockets which receive the balls on the ends of the fast (inner) motors 52 and 54 giving low friction and zero backlash.

Figure 4A:
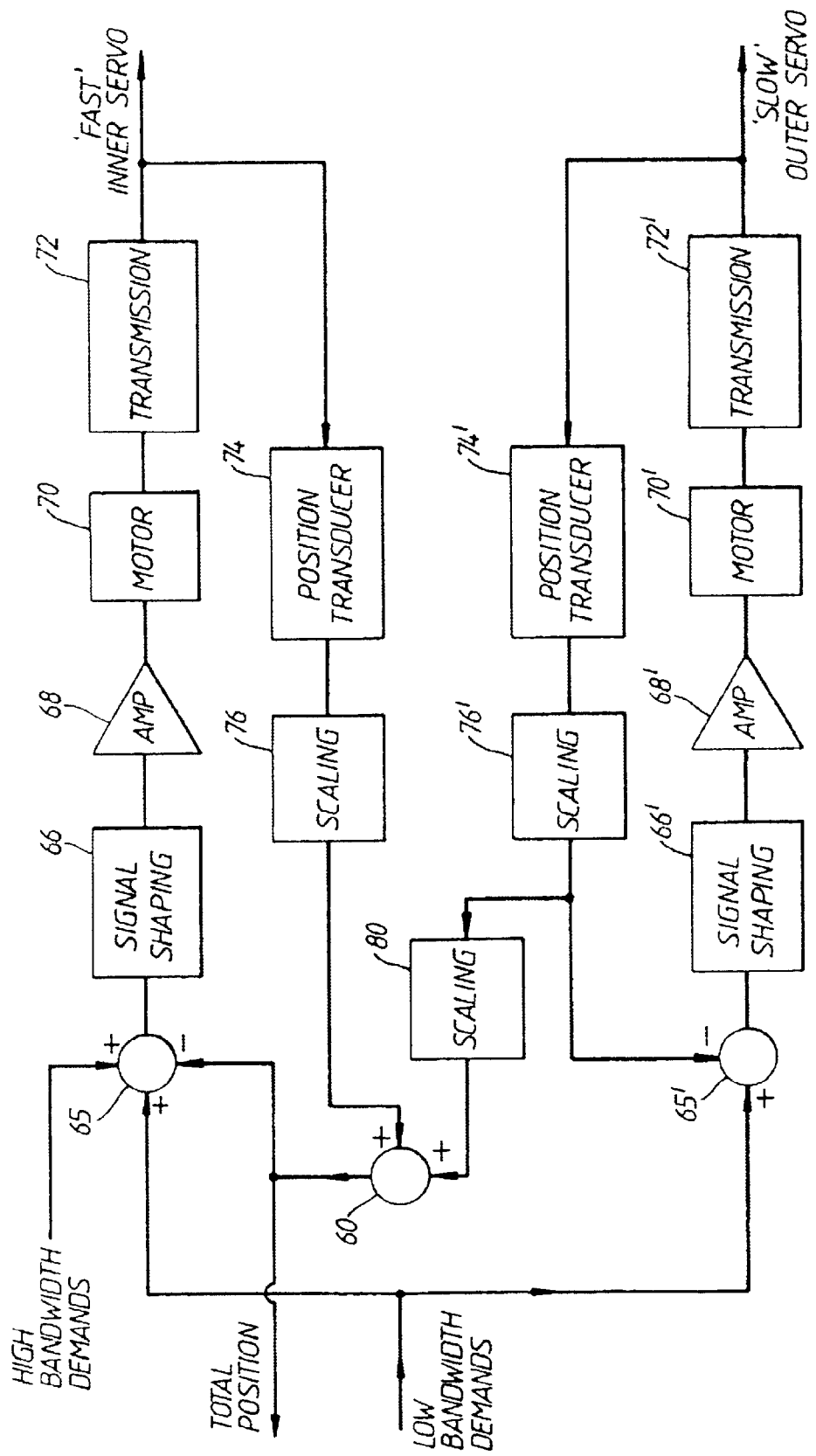
FIGS. 4a and 4b are schematic block diagrams representing two examples of control system for the arrangement of FIGS. 1 to 3.
Figure 4B:
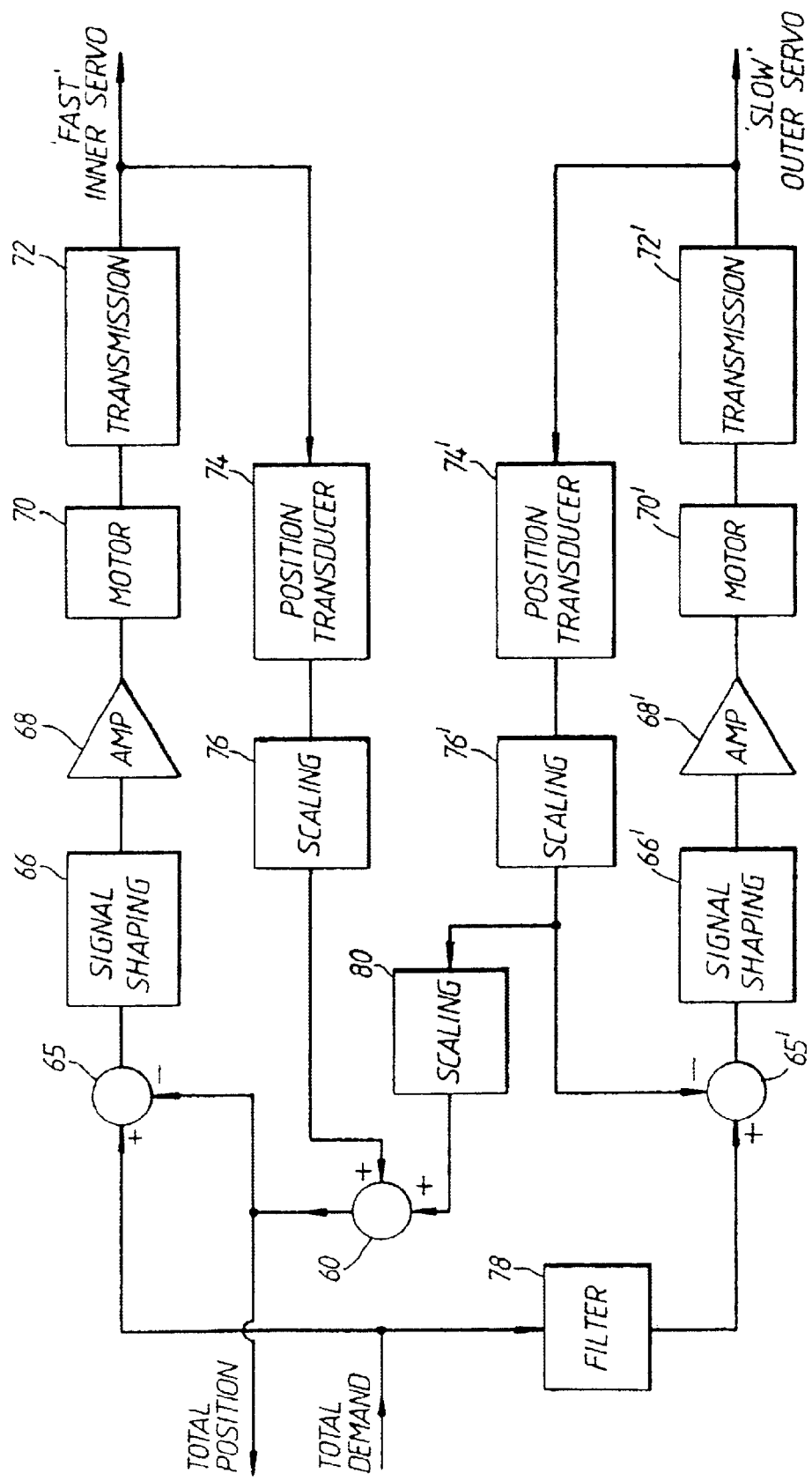

Referring now to FIGS. 4a and 4b two examples of control system will now be described. Each control system has a dual servo system and an input via which commands for the required movement are supplied to the system. The commands may control the seeker head to follow a predetermined scan pattern or to track a particular target. The control system has two channels, one serving the high bandwidth fast motor (inner) and the other serving the low bandwidth slow motor (outer), there being respective fast and slow transducers associated with the fast and slow motors.

In FIG. 4a, the high bandwidth demand input signal (i.e. one inside the ambit limits of the fast servo) is supplied to a junction 65 where it is summed with the low bandwidth demand input demand signal and compared with the aggregate scaled outputs of the fast and slow transducers 74,74'. The resultant signal is supplied to the fast channel where it is shaped at 66, amplified at 58 and supplied to the fast motor 70 and the motor output is supplied to the system via the transmission 72. The output of the transmission 72 is sensed by position transducer 74, scaled at 76 and then supplied for comparison at 60 and 65.

In the slow channel, the low bandwidth demand is compared at 65' with the scaled output from the position transducer 74', shaped at 66', amplified at 68' and supplied to the slow motor 70'. The output from the motor is supplied to the system via the transmission 72'. The output from the transmission 72' is sensed by position transducer 74', scaled at 76' and supplied for comparison at 65', and via a further scaler 80', for the comparison at 60.

In FIG. 4b, the total demand signal is supplied to a junction 65 where it is compared with the aggregate scaled outputs of the fast and slow transducers 74',74' and the resultant signal is supplied to the fast channel where it is processed as in FIG. 4a. The total demand signal is also supplied via a low pass filter 78 to remove the high bandwidth component and the resultant low bandwidth component is supplied to junction 65' and processed as in FIG. 4a.

Thus, the inner motor provides high bandwidth, low amplitude and high sensitivity, whilst the outer motor, which drives the payload platform, provides low bandwidth, high amplitude and coarse accuracy. The twin position feedback servo loops are arranged such that in times of severe demand each servo loop can help the other, with regard to frequency demands and amplitude demands. For frequency demands the fast motor helps the slow and for amplitude demands the slow helps the fast.

The use of two sets of servos offers a versatile system which can be configured to achieve a wide range of performance requirements within a space envelope as small as 80 mm diameter, for example in a mortar bomb.

The illustrated example shows a cassegrain antenna for millimetric wavebands. It will be understood that the principles disclosed herein may be applied to other types of sensors. For example, the dual servo system may be used to orient a CCD camera such as those illustrated in imaging visible or IR wavelength radiation.

The system may also be used in applications other than the missiles shown herein, where it is necessary to provide a high bandwidth large ambit system.

The examples of system disclosed herein provide an inexpensive yet rugged construction which is achieved by the use of moulded plastics and rare earth d.c. motors.

Each servo may incorporate a latch to maintain a resting position during storage, transit, etc. and during severe environmental conditions immediately prior to operations such as launch shock.

What is claimed is:

1. A dual servo system comprising:
a support means;
platform means mounted for movement in a given sense with respect to said support means;
base means;
said support means being mounted for movement in substantially the same sense with respect to said base means;
first drive means for effecting small displacements of said platform means relative to said support means;
second drive means for effecting large displacements of said support means relative to said base means; and
common control means, responsive to an input signal, for controlling said first and second drive means to orient said platform means in accordance with said input signal.

2. A seeker actuation system for a projectile including:

base means for attachment to a projectile, mounting means supported for movement in at least one sense, sensor means mounted for movement with respect to the mounting means in said at least one sense, first drive means for effecting movement of said mounting means relative to said base means in said at least one sense, second drive means for effecting movement of said sensor relative to said mounting means in said at least one sense, and common means responsive to an input demand signal to control each of said first and second drive means to move said sensor to a required position, one of said drive means being capable of effecting movement in a relatively large locus of movement and the other of said drive means being capable of effecting movement in a relatively small locus of movement.

3. A seeker actuation system according to claim 2, wherein said first drive means is capable of effecting movement through a relatively large arc.

4. A seeker actuation system according to claim 3, wherein said sensor means is mounted for pitch and yaw movement about a pivotal point and said mounting means is mounted for pitch and yaw movement about substantially the same pivotal point, and the system includes first and second yaw drive means and first and second pitch drive means for effecting movements in the pitch and yaw senses respectively.

5. A seeker actuation system according to claim 2, wherein said sensor means is mounted on said mounting means by means of a gimbal arrangement and the second drive means comprises a linear force motor arranged between the sensor means and the mounting means.

6. A seeker actuation system according to claim 2, wherein the second drive means includes a rack and pinion arrangement.

7. A seeker actuation system according to claim 2, wherein the mounting means and the base means have complementary generally spherical bearing surfaces for supporting the mounting means to pivot in at least one sense about a pivot point.

8. A seeker actuation system according to claim 2, wherein the mounting means is connected to the support means by translation plate means, the translation plate means having a concave spherical surface for engaging a complementary surface on the mounting means and a generally concentric convex spherical surface for engaging a complementary convex surface on the base means.

9. A servo system comprising:

a platform mounted for movement; and a servo loop controlling movement of said platform in accordance with an input signal, said servo loop including:

first drive means for effecting relatively large displacements of said platform within a relatively low bandwidth;

second drive means for effecting relatively small displacements of said platform within a relatively high bandwidth; and common control means, responsive to said input signal, for controlling said first and second drive means.

10. A dual servo system comprising:

a support means;

platform means mounted for movement in a given sense with respect to said support means;

base means;

said support means being mounted for movement in substantially the same sense with respect to said base means;

first drive means for effecting small displacements of said platform means relative to said support means;

second drive means for effecting large displacements of said support means relative to said base means; and control means, separate from said first and second drive means and responsive to an input signal, for controlling said first and second drive means to orient said platform means in accordance with said input signal.

11. A seeker actuation system for a projectile including:

base means for attachment to a projectile, mounting means supported for movement in at least one sense, sensor means mounted for movement with respect to the mounting means in said at least one sense, first drive means for effecting movement of said mounting means relative to said base means in said at least one sense, second drive means for effecting movement of said sensor relative to said mounting means in said at least one sense, and means, separate from said first and second drive means and responsive to an input demand signal, for controlling said first and second drive means to move said sensor to a required position, one of said drive means being capable of effecting movement in a relatively large locus of movement and the other of said drive means being capable of effecting movement in a relatively small locus of movement.

12. A seeker actuation system according to claim 11, wherein said first drive means is capable of effecting movement through a relatively large arc.

13. A seeker actuation system according to claim 12, wherein said sensor means is mounted for pitch and yaw movement about a pivotal point and said mounting means is mounted for pitch and yaw movement about substantially the same pivotal point, and the system includes first and second yaw drive means and first and second pitch drive means for effecting movement in the pitch and yaw senses respectively.

14. A servo system comprising:

a platform mounted for movement; and a servo loop controlling movement of said platform in accordance with an input signal, said servo loop including:

first drive means for effecting relatively large displacements of said platform within a relatively low bandwidth;

second drive means for effecting relatively small displacements of said platform within a relatively high bandwidth; and control means, separate from said first and second drive means and responsive to said input signal, for controlling said first and second drive means.

* * * * *